United States Patent
Luo et al.

(10) Patent No.: US 11,645,365 B2
(45) Date of Patent: May 9, 2023

(54) DYNAMIC MULTI-MODE CNN ACCELERATOR AND OPERATING METHODS

(71) Applicant: INDUSTRIAL TECHNOLOGY RESEARCH INSTITUTE, Hsinchu (TW)

(72) Inventors: Shien-Chun Luo, Kaohsiung (TW); Po-Wei Chen, Zhubei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 590 days.

(21) Appl. No.: 16/731,695

(22) Filed: Dec. 31, 2019

(65) Prior Publication Data

US 2021/0142165 A1 May 13, 2021

(30) Foreign Application Priority Data

Nov. 7, 2019 (TW) .................................. 108140517

(51) Int. Cl.
*G06F 9/38* (2018.01)
*G06N 3/08* (2023.01)
(Continued)

(52) U.S. Cl.
CPC ...... *G06F 18/24133* (2023.01); *G06F 1/3203* (2013.01); *G06F 9/3005* (2013.01);
(Continued)

(58) Field of Classification Search
CPC .......... G06N 3/08; G06N 20/00; G06N 3/063; G06N 3/0454; G06F 1/3203;
(Continued)

(56) References Cited

U.S. PATENT DOCUMENTS 8,442,927 B2   5/2013   Chakradhar et al.
8,468,109 B2   6/2013   Moussa et al.
(Continued)

FOREIGN PATENT DOCUMENTS

CN   108805792 A   11/2018
CN   109993277 A   7/2019

OTHER PUBLICATIONS

Ge et al., "Compact Convolutional Neural Network Accelerator for IoT Endpoint SoC," Electronics, vol. 8, No. 497, May 5, 2019, pp. 1-15.
(Continued)

*Primary Examiner* — Xuxing Chen
(74) *Attorney, Agent, or Firm* — Birch, Stewart, Kolsach & Birch, LLP

(57) ABSTRACT

A convolutional neural network (CNN) operation accelerator comprising a first sub-accelerator and a second sub-accelerator is provided. The first sub-accelerator comprises I units of CNN processor cores, J units of element-wise & quantize processors, and K units of pool and nonlinear function processor. The second sub-accelerator comprises X units of CNN processor cores, Y units of first element-wise & quantize processors, and Z units of pool and nonlinear function processor. The above variables I~K, X~Z are all greater than 0, and at least one of the three relations, namely, "I is different from X", "J is different from Y", and "K is different from Z", is satisfied. A to-be-performed CNN operation comprises a first partial CNN operation and a second partial CNN operation. The first sub-accelerator and the second sub-accelerator perform the first partial CNN operation and the second partial CNN operation, respectively.

12 Claims, 4 Drawing Sheets

(51) Int. Cl.
*G06F 18/2413* (2023.01)
*G06F 9/30* (2018.01)
*G06F 1/3203* (2019.01)
*G06T 3/40* (2006.01)

(52) U.S. Cl.
CPC .............. *G06F 9/3877* (2013.01); *G06N 3/08* (2013.01); *G06T 3/4046* (2013.01); *G06F 2209/5011* (2013.01)

(58) Field of Classification Search
CPC ................. G06F 9/3005; G06F 9/3877; G06F 2209/5011; G06T 3/4046; G06V 10/82; G06K 9/6271
See application file for complete search history.

(56) References Cited

U.S. PATENT DOCUMENTS

| | | | | |
|---|---|---|---|---|
| 11,275,661 | B1* | 3/2022 | Vantrease | G06N 3/063 |
| 11,281,967 | B1* | 3/2022 | Volpe | G06F 9/5038 |
| 11,347,297 | B1* | 5/2022 | Ko | G06F 1/3287 |
| 11,353,868 | B2* | 6/2022 | Appu | G06N 3/063 |
| 2017/0103299 | A1 | 4/2017 | Aydonat et al. | |
| 2017/0236053 | A1 | 8/2017 | Lavigueur et al. | |
| 2019/0042529 | A1 | 2/2019 | Nurvitadhi et al. | |
| 2022/0147791 | A1* | 5/2022 | Yao | G06V 10/82 |

OTHER PUBLICATIONS

Karim et al., "Illustrated: 10 CNN Architectures," URL:https://towardsdatascience.com/illustrated-10-cnn-architectures-95d78ace614d, Jul. 30, 2019, 23 pages.
Lin et al., "Two Parallel Deep Convolutional Neural Networks for Pedestrian Detection," International Conference on Image and Vision Computing New Zealand, 2015, 6 pages.
Taiwanese Office Action and Search Report for Taiwanese Application No. 108140517, dated Aug. 14, 2020.
Arm, "big.LITTLE Technology: The Future of Mobile: Making very high performance available in a mobile envelope without sacrificing energy efficiency," White Paper, 2013, pp. 1-12.
Manatunga et al., "SP-CNN: A Scalable and Programmable CNN-Based Accelerator," Alternative Computing Designs & Technologies, IEEE Micro, Sep. / Oct. 2015, pp. 42-50.
Meloni et al., "A High-Efficiency Runtime Reconfigurable IP for CNN Acceleration on a Mid-Range All-Programmable SoC," IEEE, 2016, 8 pages.
NVIDIA, "Application Guide v6.5," Parallel Thread Execution ISA, Nov. 2019, 346 pages.
NVIDIA, "NVIDIA CUDA C Programming Guide Version 4.2," Apr. 16, 2012, 173 pages.
Stone et al., "GPU-accelerated molecular modeling coming of age," Journal of Molecular Graphics and Modelling, vol. 29, 2010, pp. 116-125.
Tu et al., "Extensible and Reconfigurable Multi-core Processor Connecting Method," 13th IEEE Conference on Industrial Electronics and Applications (ICIEA), 2018, pp. 2548-2551.

* cited by examiner

DYNAMIC MULTI-MODE CNN ACCELERATOR AND OPERATING METHODS

This application claims the benefit of Taiwan application Serial No. 108140517, filed Nov. 7, 2019, the disclosure of which is incorporated by reference herein in its entirety.

TECHNICAL FIELD

The disclosure relates in general to a convolutional neural network (CNN) accelerator, and more particularly to a dynamic multi-mode CNN accelerator and operating method.

BACKGROUND

The CNN algorithm or model has become an important foundation in the development of computer vision. The operation of the CNN model comprises a large volume of convolutional operation and data transfer, and therefore will take a longer operation time. Particularly, the operation of the CNN model has high degrees of both parallelism and dependency. Therefore, it has become a prominent task for the industries to improve the hardware design of the accelerator to speed up the operation of the CNN model.

Firstly, the intermediate transient result of the CNN operation has a large data volume and a low re-utilization rate. The input and output of the large volume of data use high memory bandwidth of the computing device. As indicated in Table 1, due to the limited memory bandwidth, the traditional approach of increasing the computing speed of the CNN accelerator by simply increasing the number of convolutional cores, the improvement gained has gradually reached saturation. For example, when the memory bandwidth is limited, and the number of cores is increased to 2048 from 1024, the utilization rate of hardware computing capacity drops to 10% from 20%, and the frame rate CNN accelerator with 2048 cores remains at 10 fps (frames per second).

TABLE 1

| | | Less cores, More cores | | | | |
|---|---|---|---|---|---|---|
| Number of cores | | 64 | 256 | 512 | 1024 | 2048 |
| Reference power consumption | | 1 | 1.3 | 2.2 | 4 | 5.2 |
| Memory bandwidth BW(1 GB/s) when the memory bandwidth is limited | | | | | | |
| Utilization rate and speed | Inception V4 | 96%, 3 fps | 61%, 5 fps | 38%, 9 fps | 20%, 10 fps | 10%, 10 fps |
| | Mobilenet V2 | 48%, 43 fps | 13%, 38 fps | 6.5%, 46 fps | 3.2%, 46 fps | 1.6%, 46 fps |
| Memory BW (8 GB/s) when the memory bandwidth is sufficient | | | | | | |
| Utilization rate and speed | Inception V4 | 99%, 3 fps | 97%, 12 fps | 95%, 23 fps | 89%, 44 fps | 66%, 65 fps |
| | Mobilenet V2 | 66%, 59 fps | 53%, 190 fps | 37%, 265 fps | 21%, 296 fps | 12%, 344 fps |

Secondly, the convolutional cores used in the CNN models have different lengths and widths, such as 1×7, 7×1, 1×3, 3×1, 3×3, 1×1, and the number of channels gradually increases in a monotonous manner. For example, the mobilenet model has both very deep channels (64~512) and very shallow channels (the number of channels=1). As indicated in Table 2, even the accelerator architecture has the same number of cores, the accelerator operated in different models will provide different efficiencies and speeds. Therefore, it has become a prominent task for the industries to divide the CNN models and arrange an optimized process based on the number of cores and the operating model to increase the efficiency and computing speed of the accelerator.

TABLE 2

| | | | | 256 cores | |
|---|---|---|---|---|---|
| Layer | Data dimension | Weight size | Volume of operation | Number of cycles | Utilization rate |
| Model 1: Generic CNN Calculation | | | | | |
| CNN layer A | 448 × 448 × 3 | 0.4 KB | 193M | 4.39M | 8.60% |
| CNN layer B | 56 × 56 × 64 | 72 KB | 465M | 1.04M | 87% |
| CNN layer C | 28 × 28 × 128 | 288 KB | 464M | 0.97M | 93% |
| CNN layer D | 14 × 14 × 256 | 1.1 MB | 463M | 0.95M | 95% |
| CNN layer E | 7 × 7 × 512 | 4.5 MB | 463M | 2.41M | 38% |
| Model 2: Image Mode CNN Calculation | | | | | |
| CNN layer G | 448 × 448 × 3 | 0.4 KB | 193M | 0.9M | 42% |
| Model 3: DW Separable Mode CNN Calculation | | | | | |
| DW CNN layer H | 56 × 56 × 128 | 1.1 KB | 3.6M | 113K | 13% |
| PW CNN layer I | 56 × 56 × 128 | 16 KB | 51.4M | 200K | 98% |

DW = depth-wise;
PW = point-wise

SUMMARY

The disclosure relates to a convolutional neural network (CNN) accelerator, and more particularly to a CNN accelerator comprising plural sub-accelerators featured by "identical processor structure" and "different numbers of cores". The accelerator is configured to perform a convolutional neural network operation, which can be divided into plural sub-partial operations comprising a first sub-partial operation and a second sub-partial operation. The CNN accelerator comprises two sub-accelerators comprising a first sub-accelerator and a second sub-accelerator. The first sub-accelerator comprises I units of first CNN processor cores, J units of first element-wise & quantize processors, and K units of first pool and nonlinear function processor. The second sub-accelerator comprises X units of second CNN processor cores, Y units of second element-wise & quantize processors, and Z units of second pool and nonlinear function processor. In the present disclosure, the "identical processor structure" of the sub-accelerator refers to each sub-accelerator comprises a plural of CNN processor cores, at least one element-wise & quantize processors and at least one pool and nonlinear function processor. The above variables I~K, X~Z all are natural numbers greater than 0, such that each sub-accelerator can independently perform convolutional neural network operation, reduce the need of data transmission with external memory and reduce the requirement of the memory bandwidth. In the present disclosure, the "different numbers of cores" of the sub-accelerator refers to the first sub-accelerator and the second sub-accelerator satisfying a relation of "different numbers of cores", which refers to the establishment of at least one of the three relations, namely, "I is different from X", "J is different from Y", and "K is different from Z".

According to one embodiment, the at least two sub-accelerators further comprise a third sub-accelerator comprising R units of first CNN processor cores, S units of first element-wise & quantize processors, and T units of first pool and nonlinear function processor. The above variables R~T all are natural numbers greater than 0. The first sub-accelerator and the third sub-accelerator satisfy a relation of "different numbers of cores", which refers to the establishment of at least one of the three relations, namely, "I is different from R", "J is different from S", and "K is different from T". The plural sub-partial operations further comprise a third partial convolutional neural network operation, which independently performs the third partial convolutional neural network operation.

According to one embodiment, the element-wise & quantize processors are configured to process a scalar operation selected from a group of operations composed of addition, deduction, multiplication, division, batch normalization, quantization, bias and scaling.

According to one embodiment, the pool and nonlinear function processor are configured to process a non-linear activation operation selected from a group of operations composed of rectified linear unit (ReLU), Sigmoid function and Tan h function.

According to one embodiment, the convolutional neural network operation comprise the operation of T layers, the first sub-partial operation comprises the operation of the first M of the T layers, and the second sub-partial operation comprises the operation of the following N of the T layers. The first sub-accelerator performs the operation of the first M layers and then outputs an intermediate result to the second sub-accelerator, which then performs the operation of the following N layers according to the intermediate result.

According to one embodiment, the first sub-accelerator performs the first sub-partial operation for a first time interval T1, the second sub-accelerator performs the second sub-partial operation for a second time interval T2. When the first time interval T1 is substantially equivalent to the second time interval T2, then the time to complete overall CNN operation generally can be reduced. In practice, the first time interval T1 can be 80%~120% of the second time interval T2.

According to one embodiment, the convolutional neural network operation comprises a trunk operation and a first branch operation. The first sub-partial operation comprises a trunk operation, and the second sub-partial operation comprises a first branch operation. The first sub-accelerator performs a trunk operation, and the second sub-accelerator performs a first branch operation. When the convolutional neural network operation finishes the trunk operation and intends to perform the first branch operation, the first sub-accelerator enters the first power saving mode, and the second sub-accelerator exits the second power saving mode. Afterwards, when the convolutional neural network operation finishes the first branch operation and intends to perform the trunk operation, the first sub-accelerator exits the first power saving mode, and the second sub-accelerator enters the second power saving mode. The convolutional neural network operation is a dynamic branch network operation. For example, the trunk operation can be a recognition operation of main image for recognizing a main factory object which is seen more frequently, and the first branch operation can be a recognition operation of scenario image for recognizing a customized object which is seen less frequently. Besides, the trunk operation can be a recognition operation of collision sound, and the branch operation can be an operation for recognizing and analyzing an audio source.

According to one embodiment, the convolutional neural network operation comprises a trunk operation, a first branch operation and a second branch operation. The first sub-partial operation comprises a trunk operation, and the second sub-partial operation selectively comprises one of a first branch operation and a second branch operation. The first sub-accelerator performs the trunk operation, and the second sub-accelerator selectively performs one of the first branch operation and the second branch operation. When the convolutional neural network operation intends to perform the first branch operation, the second sub-accelerator loads in a program code corresponding to the first branch operation. When the convolutional neural network operation intends to perform the second branch operation, the second sub-accelerator loads in a program code corresponding to the second branch operation. The convolutional neural network operation can be a dynamic tree network operation, the first branch operation can be a passenger behavior recognition, and the second branch operation can be a vehicle behavior recognition.

According to one embodiment, an operating method adaptable to a convolutional neural network operation (CNN) accelerator is provided. The CNN accelerator is configured to perform a convolutional neural network operation, which can be divided into plural sub-partial operations comprising a first sub-partial operation and a second sub-partial operation. The CNN accelerator comprises two sub-accelerators comprising a first sub-accelerator and a second sub-accelerator. The first sub-accelerator comprises I units of first CNN processor cores, J units of first element-wise & quantize processors, and K units of first pool and nonlinear function processor. The second sub-accelerator comprises X units of second CNN processor cores, Y units of second element-wise & quantize processors, and Z units of second pool and nonlinear function processor. The first sub-accelerator and the second sub-accelerator satisfy a relation of different numbers of cores, which refers to the establishment of at least one of the three relations, namely, "I is different from X", "J is different from Y", and "K is different from Z". The operating method comprises the steps of: allocating the first sub-partial operation to the first sub-accelerator, and allocating the second sub-partial operation to the second sub-accelerator, wherein when the convolutional neural network operation finishes the first sub-partial operation, the first sub-accelerator enters a first power saving mode; when the convolutional neural network operation finishes the second sub-partial operation and intends to perform the first sub-partial operation, the first sub-accelerator exits the first power saving mode.

According to one embodiment, in the operating method, the first sub-partial operation comprises a trunk operation, and the second sub-partial operation comprises a first branch operation. The operating method further comprises the following steps of: when the convolutional neural network operation finishes the first branch operation and intends to perform the trunk operation, the second sub-accelerator enters a second power saving mode; when the convolutional neural network operation finishes the trunk operation and intends to perform the first branch operation, the second sub-accelerator exits the second power saving mode.

According to one embodiment, in the operating method, the first sub-partial operation comprises a trunk operation, and the second sub-partial operation selectively comprises one of a first branch operation and a second branch operation. The operating method further comprises the steps of: when the convolutional neural network operation finishes the trunk operation and intends to perform the first branch operation, the second sub-accelerator loads in a program code corresponding to the first branch operation; when the convolutional neural network operation finishes the trunk operation and intends to perform the second branch operation, the second sub-accelerator loads in a program code corresponding to the second branch operation.

According to another embodiment, an allocation method for inputting a convolutional neural network operation to a convolutional neural network operation (CNN) accelerator is provided. The convolutional neural network operation comprises the operation of T layers. The CNN accelerator comprises a first sub-accelerator and second sub-accelerator. The first sub-accelerator comprises I units of first CNN processor cores, J units of first element-wise & quantize processors, and K units of first pool and nonlinear function processor. The second sub-accelerator comprises X units of second CNN processor cores, Y units of second element-wise & quantize processors, and Z units of second pool and nonlinear function processor. The above variables I~K, X~Z all are natural numbers greater than 0. At least one of the three relations, namely, "I is different from X", "J is different from Y", and "K is different from Z", is satisfied. The allocation method comprises two allocation arrangements, a first allocation arrangement and a second allocation arrangement. According to the first allocation arrangement: the first sub-accelerator performs the operation of the first M layers and then outputs a first intermediate result to the second sub-accelerator, which then performs the operation of the following N layers, wherein the first sub-accelerator performs the operation of the first M layers for a first time interval T1, and the second sub-accelerator performs the operation of the following N layers for a second time interval T2. According to the second allocation arrangement, the first sub-accelerator performs the operation of the first A layers and then outputs a second intermediate result to the second sub-accelerator, which then performs the operation of the following B layers, that is, A+B=M+N, according to the second intermediate result, wherein the first sub-accelerator performs the operation of the first A layers for a third time interval T3, and the second sub-accelerator performs the operation of the following B layers for a fourth time interval T4. A ratio of the first time interval T1 to the second time interval T2 is compared with a ratio of the third time interval T3 to the fourth time interval T4. If the ratio of the first time interval T1 to the second time interval T2 is closer to 1 than the ratio of the third time interval T3 to the fourth time interval T4, then the first sub-accelerator and the second sub-accelerator perform an operation according to the first allocation arrangement. If the ratio of the third time interval T3 to the fourth time interval T4 is closer to 1 than the ratio of the first time interval T1 to the second time interval T2, then the first sub-accelerator and the second sub-accelerator perform an operation according to the second allocation arrangement.

According to another embodiment, an allocation method for inputting a convolutional neural network operation to a convolutional neural network operation (CNN) accelerator is provided. The convolutional neural network operation comprises the operation of T layers. The CNN accelerator comprises a first sub-accelerator and a second sub-accelerator. The first sub-accelerator comprises I units of first CNN processor cores, J units of first element-wise & quantize processors, and K units of first pool and nonlinear function processor. The second sub-accelerator comprises X units of second CNN processor cores, Y units of second element-wise & quantize processors, and Z units of second pool and nonlinear function processor. The above variables I~K, X~Z all are natural numbers greater than 0. At least one of the three relations, namely, "I is different from X", "J is different from Y", and "K is different from Z". The allocation method comprises two allocation arrangements, a first allocation arrangement and a second allocation arrangement. According to the first allocation arrangement, the first sub-accelerator performs the operation of the first M layers and then outputs a first intermediate result to the second sub-accelerator, which then performs the operation of the following N layers according to the first intermediate result, wherein the first sub-accelerator consumes a first power E1 for performing the operation of the first M layers, and the second sub-accelerator consumes a second power E2 for performing the operation of the following N layers. According to the second allocation arrangement, the first sub-accelerator performs the operation of the first A layers and then outputs a second intermediate result to the second sub-accelerator, which then performs the operation of the following B layers, that is, A+B=M+N, according to the second intermediate result, wherein the first sub-accelerator consumes a third power E3 for performing the operation of the first A layers, and the second sub-accelerator consumes a fourth power E4 for performing the operation of the following B layers. A sum of the first power E1 plus the second power E2 is compared with a sum of the third power E3 plus the fourth power E4. If the sum of the first power E1 plus the second power E2 is lower than the sum of the third power E3 plus the fourth power E4, then the first sub-accelerator and the second sub-accelerator perform an operation according to the first allocation arrangement. If the sum of the third power E3 plus the fourth power E4 is lower than the sum of the first power E1 plus the second power E2, then the first sub-accelerator and the second sub-accelerator perform an operation according to the second allocation arrangement.

The above and other embodiments will become easier understood with regard to the following detailed description of these embodiments. The following description is made with reference to the accompanying drawings.

BRIEF DESCRIPTION OF THE DRAWINGS

FIG. 1 B is a hardware architecture diagram of the interior of each CNN sub-accelerator.

Figure 1A:
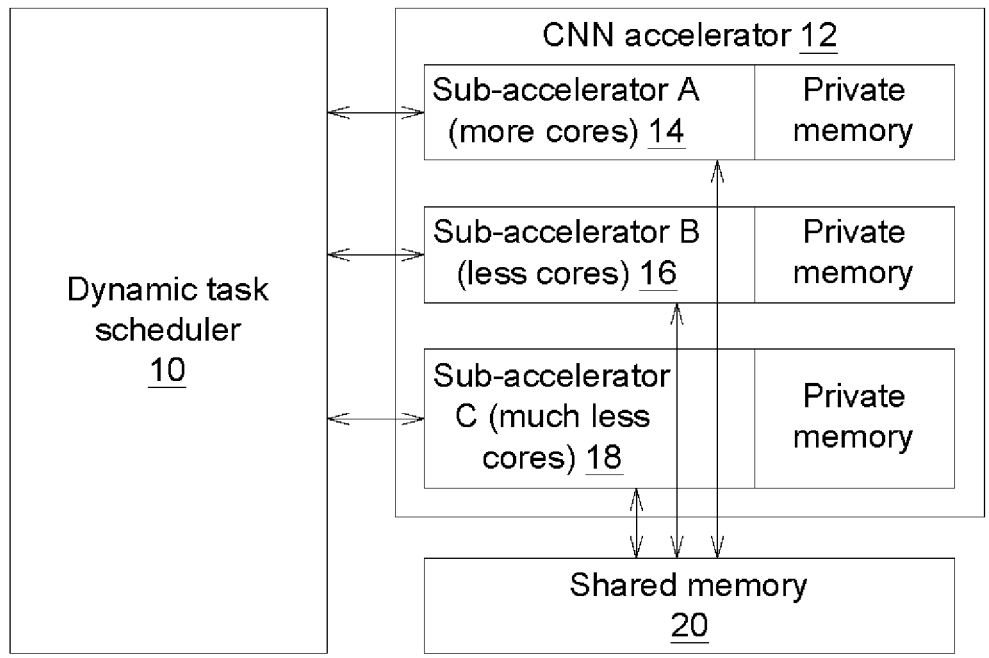
FIG. 1 A is a hardware architecture diagram of a CNN accelerator.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

FIG. 1 A is a hardware architecture diagram of a CNN accelerator 12. The CNN accelerator 12 receives data from a dynamic task scheduler 10 and further works with an external shared memory 20 to perform CNN operation. The CNN accelerator 12 has at least two sub-accelerators disposed therein. As exemplified in FIG. 1, the CNN accelerator 12 comprises three CNN sub-accelerators (first CNN sub-accelerator 14, second CNN sub-accelerator 16, and third CNN sub-accelerator 18), but the number of CNN sub-accelerators is not limited thereto. Each sub-accelerator has a private memory.

Figure 1B:
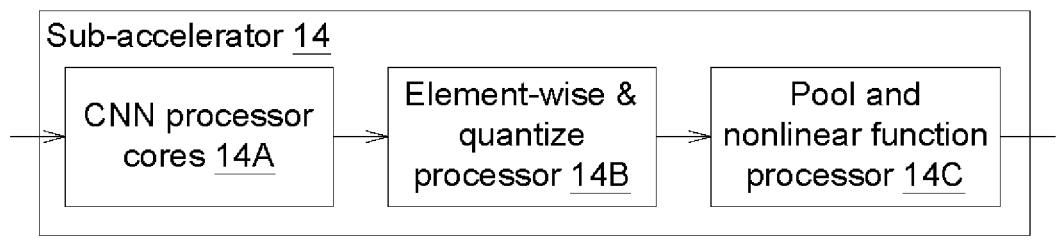

FIG. 1B is a hardware architecture diagram of the interior of each CNN sub-accelerator 14. The first CNN sub-accelerator 14, the second sub-accelerator 16 and the third sub-accelerator 18 have an identical processor structure. That is, each of the three sub-accelerators comprises three types of operation processors, namely, CNN processor cores 14A, element-wise & quantize processors 14B and pool and nonlinear function processor 14C.

The three sub-accelerators have different numbers of operation processors.

For example, the first sub-accelerator 14 comprises I units of first CNN processor cores, J units of first element-wise & quantize processors, and K units of first pool and nonlinear function processor; the second sub-accelerator 16 comprises X units of second CNN processor cores, Y units of second element-wise & quantize processors, and Z units of second pool and nonlinear function processor; the third sub-accelerator 18 comprises R units of first CNN processor cores, S units of first element-wise & quantize processors, and T units of first pool and nonlinear function processor, wherein the above variables I~K, R~T, X~Z all are natural numbers greater than 0. The feature of the first sub-accelerator 14 and the second sub-accelerator 16 comprising different number of cores refers to the establishment of at least one of the three relations, namely, "I is different from X", "J is different from Y", and "K is different from Z". Similarly, the feature of the first sub-accelerator 14 and the third sub-accelerator 18 comprising different number of cores refers to the establishment of at least one of the three relations, namely, "A is different from R", "B is different from S", and "C is different from T".

As indicated in FIG. 1, the first sub-accelerator 14 has more CNN processor cores, the second sub-accelerator 16 has less CNN processor cores, and the third sub-accelerator 18 has much less CNN processor cores.

The element-wise & quantize processors 14B are configured to process a scalar operation selected from a group of operations composed of addition, deduction, multiplication, division, batch normalization, quantization, bias and scaling. The pool and nonlinear function processor 14C are configured to process a non-linear activation operation selected from a group of operations composed of rectified linear unit (ReLU), Sigmoid function and Tan h function.

First Embodiment

Figure 2:
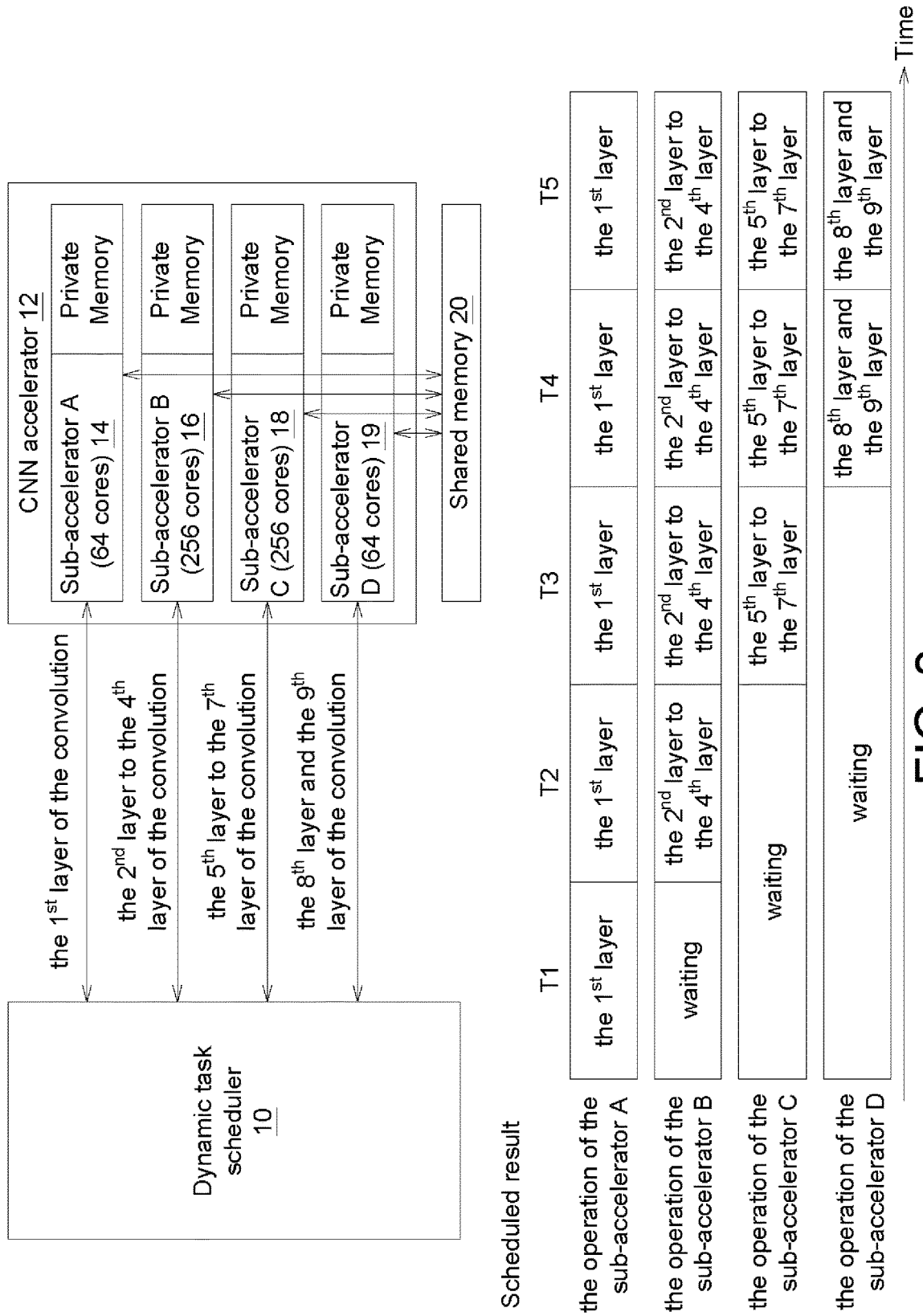
FIG. 2 is a schematic diagram of allocating operation of different layers to different sub-accelerators for performing pipeline parallel processing according to an embodiment of the disclosure.

FIG. 2 is a schematic diagram of allocating operation of different layers to four different sub-accelerators for performing parallel processing according to an embodiment of the disclosure. The first sub-accelerator 14 has 64 CNN processor cores, the second sub-accelerator 16 has 256 CNN processor cores, the third sub-accelerator 18 has 256 CNN processor cores, and the fourth sub-accelerator 19 has 64 CNN processor cores.

Refer to FIG. 2. The convolutional neural network operation comprises the operation of nine layers. According to a first allocation arrangement, the convolutional neural network operation of nine layers is divided into a first partial operation, a second partial operation, a third partial operation and a fourth partial operation. The first partial operation comprises the operation of one layer, that is, the $1^{st}$ layer. The second partial operation comprises the operation of three layers, that is, the $2^{nd}$ layer to the $4^{th}$ layer. The third partial operation comprises the operation of three layers, that is, the $5^{th}$ layer to the $7^{th}$ layer. The fourth partial operation comprises the operation of two layers, that is the $8^{th}$ layer and the $9^{th}$ layer. The first sub-accelerator 14 firstly performs the first partial operation (the operation of the $1^{st}$ layer) and then outputs a first intermediate result R1. The second sub-accelerator 16 receives the first intermediate result R1 and continues to perform the second partial operation (the operation of the $2^{nd}$ layer to the $4^{th}$ layer) and then outputs a second intermediate result R2. The third sub-accelerator 18 receives the second intermediate result R2 and continues to perform the second partial operation (the operation of the $5^{th}$ layer to the $7^{th}$ layer). The fourth sub-accelerator 19 receives the third intermediate result R3 and continues to perform the fourth partial operation (the operation of the $8^{th}$ layer and the $9^{th}$ layer).

In view of the timing sequence diagram, (1) within the time interval T1, the first sub-accelerator 14 performs the operation of the $1^{st}$ layer of the first convolution, and the second sub-accelerator 16, the third sub-accelerator 18 and the fourth sub-accelerator 19 all are waiting; (2) within the time interval T2, the first sub-accelerator 14 performs the operation of the $1^{st}$ layer of the second convolution, the second sub-accelerator 16 performs the operation of the $2^{nd}$ layer to the $4^{th}$ layer of the first convolution, and the third sub-accelerator 18 and the fourth sub-accelerator 19 both are waiting; (3) within the time interval T3, the first sub-accelerator 14 performs the operation of the $1^{st}$ layer of the third convolution, the second sub-accelerator 16 performs the operation of the $2^{nd}$ layer to the $4^{th}$ layer of the second convolution, the third sub-accelerator 18 performs the operation of the $5^{th}$ layer to the $7^{th}$ layer of the first convolution, and the fourth sub-accelerator 19 is waiting; (4) within the time interval T4, the first sub-accelerator 14 performs the operation of the $1^{st}$ layer of the fourth convolution, the second sub-accelerator 16 performs the operation of the $2^{nd}$ layer to the $4^{th}$ layer of the third convolution, the third sub-accelerator 18 performs the operation of the $5^{th}$ layer to the $7^{th}$ layer of the second convolution, and the fourth sub-accelerator 19 performs the operation of the $8^{th}$ layer and the $9^{th}$ layer of the first convolution. From the time interval T5, each unit time interval T will output a result of the convolutional operation of nine layers. From the time interval T4, the four sub-accelerators of the multi-stage pipeline operation architecture start to operate simultaneously and achieve the effect of parallel processing.

The unit time interval T is determined according to the longest time among the times required for each sub-accelerator to complete corresponding allocated CNN operation. For example, suppose the first sub-accelerator 14 takes 3.61 nsec to complete the operation of the $1^{st}$ layer of the convolution, the second sub-accelerator 16 takes 3.61 nsec to complete the operation of the $2^{nd}$ layer to the $4^{th}$ layer of the convolution, the third sub-accelerator 18 takes 3.21 nsec to complete the operation of the $5^{th}$ layer to the $7^{th}$ layer of the convolution, and the fourth sub-accelerator 19 takes 4.51 nsec to complete the operation of the $8^{th}$ layer and the $9^{th}$ layer of the convolution, then the unit time interval T will be set to be greater than 4.51 nsec.

If the focus is to increase the efficiency of the operation of the multi-stage pipeline architecture, then more attention is paid to the longest time among the times required for each sub-accelerator to perform corresponding CNN operation, so that the length of the unit time interval T for one pipeline stage can be reduced. During the design planning stage, a second allocation arrangement can be tried. For example, under the second allocation arrangement, suppose the first sub-accelerator 14 takes 4.7 nsec to perform the operation of the $1^{st}$ to the $2^{nd}$ layer of the convolution, the second sub-accelerator 16 takes 3.7 nsec to perform the operation of the $3^{rd}$ to the $5^{th}$ layer of the convolution, the third sub-accelerator 18 takes 3.31 nsec to perform the operation of the $6^{th}$ layer to the $8^{th}$ layer of the convolution, and the fourth sub-accelerator 19 takes 4.0 nsec to perform the operation of the $9^{th}$ layer of the convolution, then the longest time is over 4.51 nsec. It shows the first allocation arrangement shown in the FIG. 2 can achieve a shorter unit time interval T, and the multi-stage pipeline operation can provide a higher efficiency. Thus, the first allocation arrangement shown in the FIG. 2 is superior to the second allocation arrangement. During the design planning stage, the difference of the longest time interval deducted by the shortest time interval or the ratio of the longest time interval to the shortest time interval can be used as a criterion for selecting the allocation arrangement which achieves a shorter unit time interval T for one pipeline stage. When the first time interval T1 (the longest time interval) is substantially equivalent to the second time interval T2 (the shortest time interval), then the time to complete overall CNN operation can be reduced. In practice, the first time interval T1 can be 80%~120% of the second time interval T2.

If the focus is to decrease the power consumption of the operation of the multi-stage pipeline architecture, then more attention is paid to the sum of the power consumption required for each sub-accelerator to perform the operation of the corresponding layer(s). During the design planning stage, the first allocation arrangement as indicated in FIG. 2 can be tried first. The simulation result shows that the first sub-accelerator 14 consumes power E1 to perform the operation of the operation of the $1^{st}$ layer of the convolution, the second sub-accelerator 16 consumes power E2 to perform the operation of the $2^{nd}$ layer to the $4^{th}$ layer of the convolution, the third sub-accelerator 18 consumes power E3 to perform the operation of the $5^{th}$ layer to the $7^{th}$ layer of the convolution, and the fourth sub-accelerator 19 consumes power E4 to perform the operation of the $8^{th}$ layer and the $9^{th}$ layer of the convolution. Then, a third allocation arrangement is tried. The simulation result shows that the first sub-accelerator 14 consumes power E5 to perform the operation of the $1^{st}$ layer to the $2^{nd}$ layer of the convolution, the second sub-accelerator 16 consumes power E6 to perform the operation of the $3^{rd}$ layer to the $5^{th}$ layer of the convolution, the third sub-accelerator 18 consumes power E7 to perform the operation of the $6^{th}$ layer to the $8^{th}$ layer of the convolution, and the fourth sub-accelerator 19 consumes power E8 to perform the operation of the $9^{th}$ layer of the convolution. If the sum of the powers E1, E2, E3 and E4 is smaller than the sum of the powers E5, E6, E7 and E8, then CNN operation is performed according to the first allocation arrangement as shown in FIG. 2. If the sum of the powers E5, E6, E7 and E8 is smaller than the sum of the powers E1, E2, E3 and E4, then CNN operation is performed according to the second allocation arrangement. During the design planning stage, the sum of power consumption can be used as a criterion for determining the allocation arrangement, so lower total power consumption for all sub-accelerators consumed to complete the CNN operation is achieved.

The above disclosure is exemplified by four sub-accelerators. When the number of sub-accelerators changes, the difference of the longest time interval deducted by the shortest time interval, the ratio of the longest time interval to the shortest time interval, or the sum of power consumption still can be used as a criterion for allocating operation to different sub-accelerators, so a shorter time to complete overall CNN operation is achieved.

Second Embodiment

Figure 3:
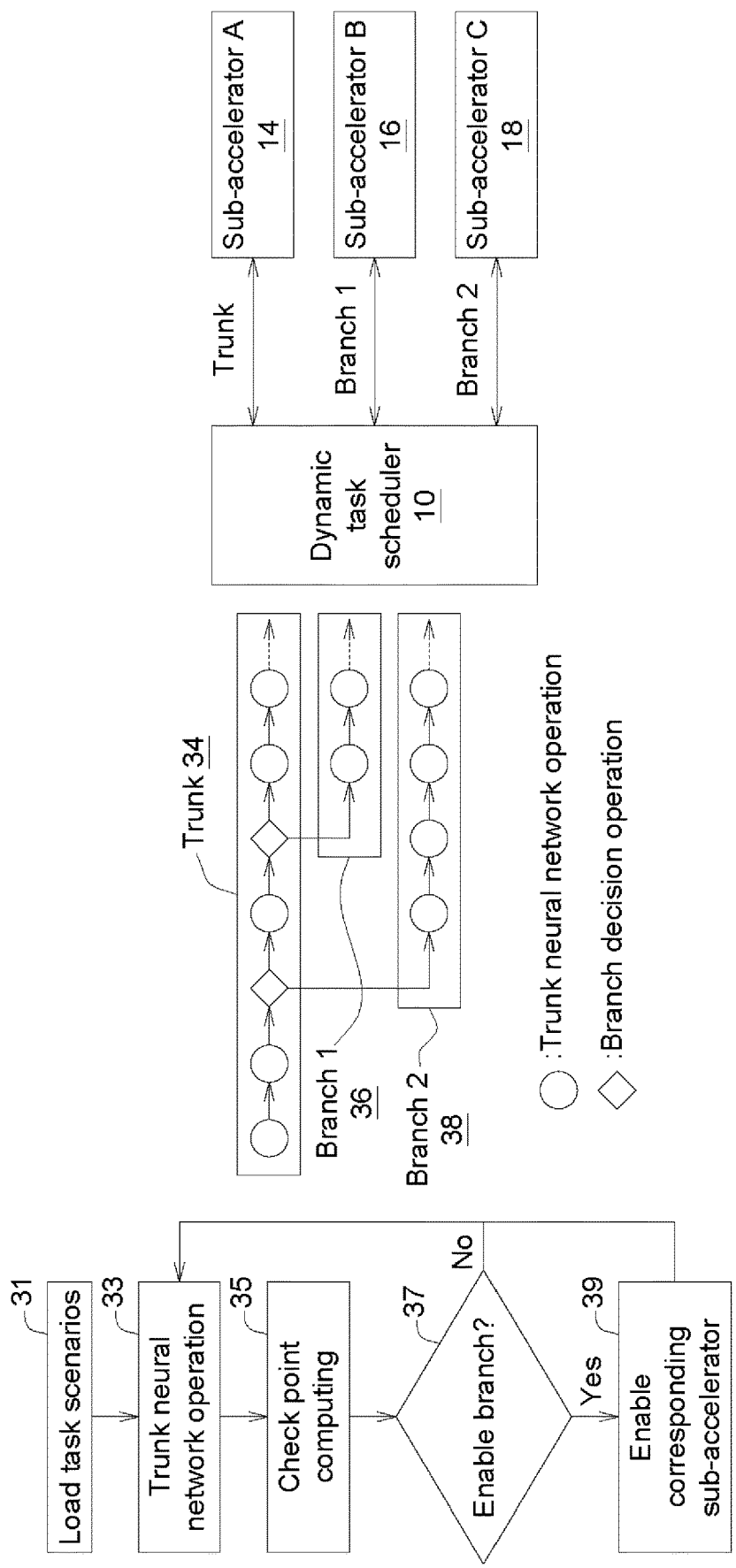
FIG. 3 is a schematic diagram of allocating trunk and branch operations to different sub-accelerators for processing according to another embodiment of the disclosure.

FIG. 3 is a schematic diagram of allocating trunk and branch operations to different sub-accelerators 14, 16 and 18 of a CNN accelerator by a dynamic task scheduler 10 according to another embodiment of the disclosure, wherein the convolutional neural network operation comprises a trunk operation 34, a first branch operation 36 and a second branch operation 38. The first sub-accelerator 14 (with more CNN processor cores) performs the network in the trunk operation 34, and the second sub-accelerator 16 (with less CNN processor cores) and the third sub-accelerator 18 (with much less CNN processor cores) perform the first branch operation 36 and the second branch operation 38, respectively.

To save the power consumption of the entire accelerator, in step 37, after check point computing, whether the CNN accelerator should enable one of the branch operations 36 and 38 is determined. When the convolutional neural network operation completes the trunk operation 34 and intends to perform the first branch operation 36, the first sub-accelerator 14 enters the first power saving mode, and the process proceeds to step 39. In step 39, the corresponding second sub-accelerator 16 is enabled and exits the second power saving mode. When the convolutional neural network operation finishes the first branch operation 36 and intends to perform the trunk operation 34, the first sub-accelerator 14 exits the first power saving mode, and the second sub-accelerator 16 enters the second power saving mode. Thus, the effect of dynamic power saving can be achieved. Similarly, when the convolutional neural network operation switches between the trunk operation 34 and the second branch operation 38, the third sub-accelerator 18 will also selectively exit and enter the third power saving mode.

This another embodiment is mainly used in the scenario of dynamic branch network operation. The to-be-recognized images can be divided into a primary category and a secondary category. The trunk operation 34 is a main image recognition which has a higher frequency or requires a longer time of continuous operation. The first branch operation 36 is a scenario image recognition which has a lower frequency or operates occasionally for a shorter time. The trunk operation 34 and the first branch operation share the front-end feature map of the neural network in the trunk operation 34. For example, the trunk operation can be a recognition operation of main image for recognizing a main factory object which is seen more frequently, and the first branch operation can be a recognition operation of scenario image for recognizing a customized object which is seen less frequently. Besides, the trunk operation can be a recognition operation of collision sound, and the branch operation can be an operation for recognizing and analyzing an audio source for the collision sound.

Third Embodiment

Figure 4:
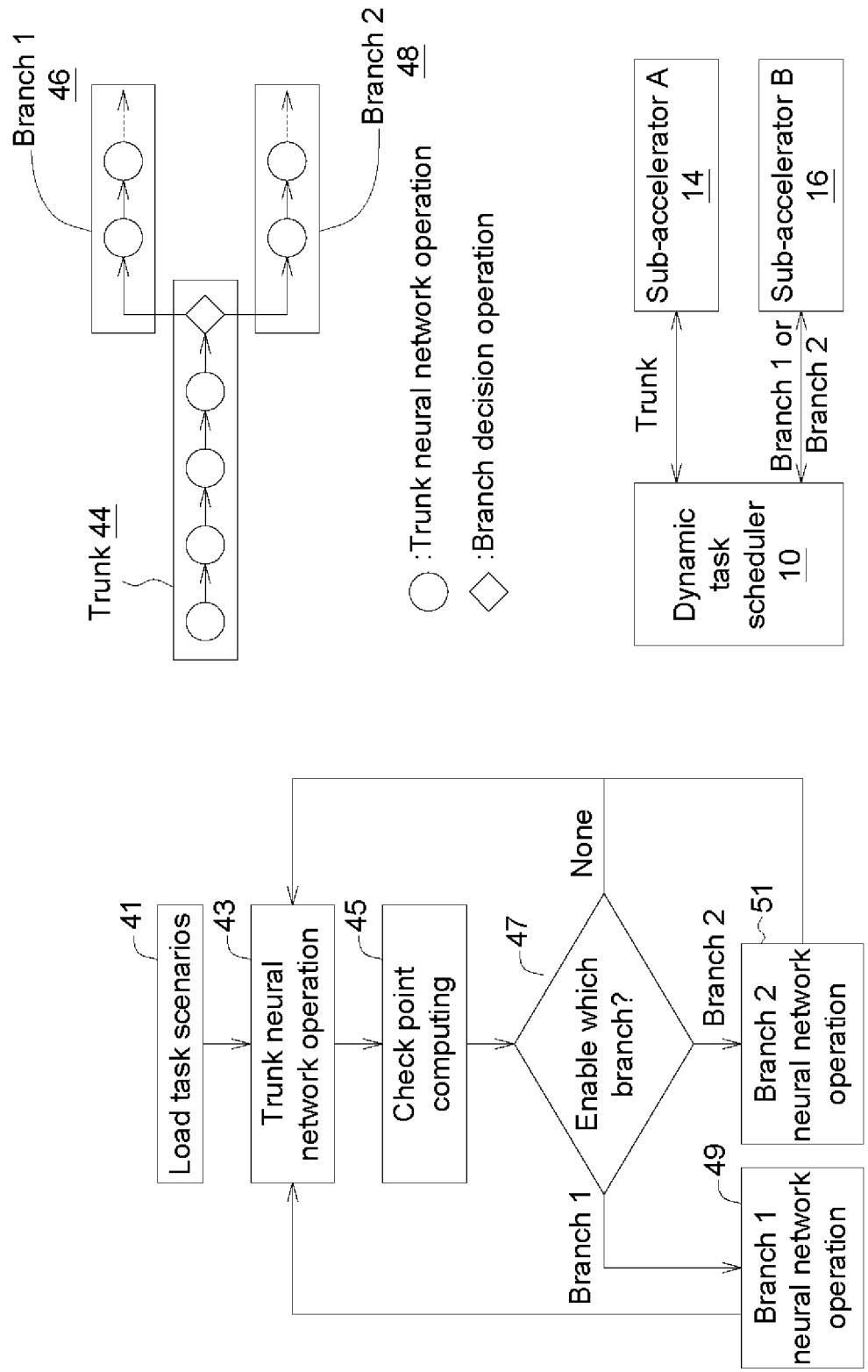
FIG. 4 is a schematic diagram of allocating trunk and branch operations to different sub-accelerators for processing according to another embodiment of the disclosure.

FIG. 4 is a schematic diagram of allocating trunk and branch operations to different sub-accelerators 14 and 16 of a CNN accelerator by a dynamic task scheduler 10 according to another embodiment of the disclosure, wherein the convolutional neural network operation comprises a trunk operation 44, a first branch operation 46 and a second branch operation 48. The first sub-accelerator 14 performs the trunk operation 44, the second sub-accelerator 16 is left available for further dynamic designation, and the second sub-accelerator 16 selectively performs one of the first branch operation 46 and the second branch operation 48. When the convolutional neural network operation intends to perform the first branch operation 46, the second sub-accelerator 16 loads in a program code corresponding to the first branch operation 46. When the convolutional neural network operation intends to perform the second branch operation 48, the second sub-accelerator 16 loads in a program code corresponding to the second branch operation 48.

To save the power consumption of the entire accelerator, in step 47, after the check point computing, whether the CNN accelerator should enable one of the branch operations 46 and 48 is determined. When the convolutional neural network operation finishes the trunk operation 44 and intends to perform the first branch operation 46, the first sub-accelerator 14 enters the first power saving mode, and the process proceeds to step 49. In step 49, the second sub-accelerator 16 is enabled and exits the second power saving mode. When the convolutional neural network operation finishes the first branch operation 46 and intends to perform the trunk operation 44, the first sub-accelerator 14 exits the first power saving mode, and the second sub-accelerator 16 enters the second power saving mode. Thus, the effect of dynamic power saving can be achieved. Similarly, when the convolutional neural network operation finishes the trunk operation 44 and switches between the second branch operation 48, the process proceeds to step 51. In step 51, the second sub-accelerator 16 is enabled and exits the second power saving mode.

The another embodiment of the disclosure is mainly used in an event-triggered dynamic tree network operation. That is, the neural network in the trunk operation 44 performs object detection and roughly divide the detected objects into two types, A and B. When an object A is detected, the neural network in the first branch operation 46 performs fine recognition on the object A. When an object B is detected, the neural network in the second branch operation 48 performs fine recognition on the object B. A specific embodiment could be as follows: the neural network in the trunk operation 44 is used for vehicle detection on autopilot. When a person on the roadside is detected, the second sub-accelerator 16 loads in a program code corresponding to the neural network in the first branch operation 46 to perform a branch operation relevant to human recognition. When an adjacent vehicle is detected, the second sub-accelerator 16 loads in a program code corresponding to the neural network in the second branch operation 48 to perform a branch operation relevant to vehicle recognition. If the neural network in the trunk operation 44 does not detect any person or vehicle, then the neural network in the trunk operation 44 continues and there is no need to trigger the first branch operation 46 or the second branch operation 48.

Refer to Table 3 and Table 4, which show a comparison of operation time and power consumption between the dynamic multi-mode CNN accelerator of the first embodiment as indicated in FIG. 2 and the single 2048-core CNN accelerator of the prior art for completing a same CNN operation. According to the first embodiment, the dynamic multi-mode CNN accelerator comprises four sub-accelerators featured by "identical processor structure" and "different numbers of cores" and composed of two 64-core sub-accelerators and two 256-core sub-accelerators. The dynamic multi-mode CNN accelerator adopts a pipeline parallel processing architecture and has an operating clock of 600 MHz and a memory transmission bandwidth of 8 GB in total. The four sub-accelerators independently perform a partial convolutional neural network operation but output a complete result of convolutional neural network operation after four stages of pipeline parallel processing. According to the prior art, single 2048-core CNN accelerator, under the condition of the same operating clock of 600 MHz and the same memory transmission bandwidth of 8 GB, independently performs the same complete convolutional neural network operation. A comparison of operation time and simulated power consumption between the two types of CNN accelerators disclosed above is listed in Table 3 and Table 4.

As indicated in Table 3: based on the architecture of the single 2048-core accelerator of the prior art, a complete result of convolutional neural network operation is outputted every 4.7 nsec; based on the architecture of the four sub-accelerators CNN accelerators of the disclosure, a complete result of convolutional neural network operation is outputted every 4.51 nsec. As indicated in Table 4: based on the architecture of the single 2048-core accelerator of the prior art, the operation consumes a power of 420 mW; based on the architecture of the four sub-accelerators CNN accelerators of the disclosure, the operation consumes a power of 370 mW. The above comparison shows that the architecture of the dynamic multi-mode CNN accelerator of the disclosure comprising at least two sub-accelerators is superior to the architecture of the single 2048-core CNN accelerator of the prior art in terms of both operation time and power consumption.

TABLE 3

| CNN convolutional model | Cycle of 2048 cores | Cycle of 64-Core Memory bandwidth 2 GB/s | Cycle of 256-Core Memory bandwidth 1 GB/s | Cycle of 256-Core Memory bandwidth 1 GB/s | Cycle of 64-Core Memory bandwidth 4 GB/s |
|---|---|---|---|---|---|
| 1-layer convolution CONV1 | 1.81 | 3.61 | | | |
| 2-layer convolution CONV2 | 0.45 | | 1.81 | | |
| 3-layer convolution CONV3 | 0.23 | | 0.90 | | |
| 4-layer convolution CONV4 | 0.11 | | 0.90 | | |
| 5-layer convolution CONV5 | 0.11 | | | 0.90 | |
| 6-layer convolution CONV6 | 0.11 | | | 0.90 | |
| 7-layer convolution CONV7 | 0.35 | | | 1.40 | |
| 8-layer convolution CONV8 | 0.18 | | | | 1.81 |
| 9-layer convolution CONV9 | 1.35 | | | | 2.70 |
| Sum | 4.70 | 3.61 | 3.61 | 3.21 | 4.51 |

TABLE 4

| | Single 2048-core accelerator | Dual 64 and Dual 256 640 cores in total |
|---|---|---|
| Frequency | 600 MHz | All are 600 MHz |
| Memory bandwidth | 8 GB/s | Respectively: 1,1,2,4 GB/s Sum: 8 GB/s |
| Internal memory | 512 KB | 512 KB (128 KB each) |
| Number of operating clocks | 4.7 million | 4.5 million |
| Simulated power consumption | About 420 mW | About 370 mW |
| Power saving function | Coarse grained | Fine grained |

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A convolutional neural network operation (CNN) accelerator configured to perform a convolutional neural network operation, which can be divided into a plurality of sub-partial operations at least comprising a first sub-partial operation and a second sub-partial operation, wherein the CNN accelerator comprises:
at least two sub-accelerators, comprising:
a first sub-accelerator, comprising:
I units of first CNN processor cores;
J units of first element-wise & quantize processors; and
K units of first pool and nonlinear function processors;
a second sub-accelerator, comprising:
X units of second CNN processor cores;
Y units of second element-wise & quantize processors; and
Z units of second pool and nonlinear function processors, wherein the above variables I, J, K, X, Y, Z are all greater than 0;
wherein the first sub-accelerator independently performs the first sub-partial operation;
wherein the second sub-accelerator independently performs the second sub-partial operation;
wherein the first sub-accelerator and the second sub-accelerator satisfy a relation of different numbers of cores, which refers to the establishment of at least one of the three relations, namely, "I is different from X", "J is different from Y", and "K is different from Z", and
wherein the convolutional neural network operation comprises the operation of T layers, the first sub-partial operation comprises the operation of the first M of the T layers, and the second sub-partial operation comprises the operation of the following N of the T layers; the first sub-accelerator performs the operation of the first M layers and then outputs an intermediate result to the second sub-accelerator, which then performs the operation of the following N layers according to the intermediate result.

2. The CNN accelerator according to claim 1, wherein the plurality of sub-partial operations further comprise a third partial convolutional neural network operation, and the CNN accelerator further comprise a third sub-accelerator, comprising:
R units of first CNN processor cores;
S units of first element-wise & quantize processors; and
T units of first pool and nonlinear function processor, wherein the above variables R~T are all greater than 0;
wherein the third sub-accelerator independently performs the third partial convolutional neural network operation;
wherein the first sub-accelerator and the third sub-accelerator satisfy a relation of different numbers of cores, which refers to the establishment of at least one of the three relations, namely, "I is different from R", "J is different from S", and "K is different from T".

3. The CNN accelerator according to claim 1, wherein the element-wise & quantize processors are configured to process a scalar operation selected from a group of operations composed of addition, deduction, multiplication, division, batch normalization, quantization, bias and scaling.

4. The CNN accelerator according to claim 1, wherein the pool and nonlinear function processor are configured to process a non-linear activation operation selected from a group of operations composed of rectified linear unit (ReLU), Sigmoid function and Tanh function.

5. The CNN accelerator according to claim 1, wherein the first sub-accelerator performs the first sub-partial operation for a first time interval T1, the second sub-accelerator performs the second sub-partial operation for a second time interval T2, and the first time interval T1 is substantially equivalent to the second time interval T2.

6. The CNN accelerator according to claim 1, wherein the convolutional neural network operation comprises a trunk operation and a first branch operation; the first sub-partial operation comprises the trunk operation, and the second sub-partial operation comprises the first branch operation; the first sub-accelerator performs the trunk operation, and the second sub-accelerator performs the first branch operation.

7. The CNN accelerator according to claim 6, wherein when the convolutional neural network operation finishes the trunk operation, the first sub-accelerator enters a first power saving mode; when the convolutional neural network operation performs the trunk operation, the first sub-accelerator exits the first power saving mode.

8. The CNN accelerator according to claim 6, wherein when the convolutional neural network operation performs the trunk operation, the second sub-accelerator enters a second power saving mode; when the convolutional neural network operation finishes the trunk operation and intends to perform the first branch operation, the second sub-accelerator exits the second power saving mode.

9. The CNN accelerator according to claim 1, wherein the convolutional neural network operation comprises a trunk operation, a first branch operation and a second branch operation; the first sub-partial operation comprises the trunk operation, and the second sub-partial operation selectively comprises one of the first branch operation and the second branch operation; the first sub-accelerator performs the trunk operation, and the second sub-accelerator selectively performs one of the first branch operation and the second branch operation; when the convolutional neural network operation intends to perform the first branch operation, the second sub-accelerator loads in a program code corresponding to the first branch operation; when the convolutional neural network operation intends to performs the second branch operation, the second sub-accelerator loads in a program code corresponding to the second branch operation.

10. An operating method adaptable to a convolutional neural network operation (CNN) accelerator configured to perform a convolutional neural network operation, which can be divided into a plurality of sub-partial operations at least comprising a first sub-partial operation and a second sub-partial operation, wherein the CNN accelerator comprise two sub-accelerators comprising a first sub-accelerator and a second sub-accelerator; the first sub-accelerator comprises I units of first CNN processor cores, J units of first element-wise & quantize processors, and K units of first pool and nonlinear function processor; the second sub-accelerator comprises X units of second CNN processor cores, Y units of second element-wise & quantize processors, and Z units of second pool and nonlinear function processor; the first sub-accelerator and the second sub-accelerator satisfy a relation of different numbers of cores, which refers to the establishment of at least one of the three relations, namely, "I is different from X", "J is different from Y", and "K is different from Z"; the operating method comprises the steps of:
performing the first sub-partial operation by the first sub-accelerator;
performing the second sub-partial operation by the second sub-accelerator;
when the convolutional neural network operation finishes the first sub-partial operation, the first sub-accelerator enters a first power saving mode, and
when the convolutional neural network operation performs the first sub-partial operation, the first sub-accelerator exits the first power saving mode.

11. The operating method according to claim 10, wherein the first sub-partial operation comprises a trunk operation, and the second sub-partial operation comprises a first branch operation; the operating method further comprises the step of: when the convolutional neural network operation finishes the first branch operation and intends to perform the trunk operation, the second sub-accelerator enters a second power saving mode; when the convolutional neural network operation finishes the trunk operation and intends to perform the first branch operation, the second sub-accelerator exits the second power saving mode.

12. The operating method according to claim 10, wherein the first sub-partial operation comprises a trunk operation, and the second sub-partial operation selectively comprises one of a first branch operation and a second branch operation; the operating method further comprises the step of: when the convolutional neural network operation finishes the trunk operation and intends to perform the first branch operation, the second sub-accelerator loads in a program code corresponding to the first branch operation; when the convolutional neural network operation finishes the trunk operation and intends to perform the second branch operation, the second sub-accelerator loads in a program code corresponding to the second branch operation.

* * * * *